(12) United States Patent
Charling

(10) Patent No.: US 12,185,675 B2
(45) Date of Patent: Jan. 7, 2025

(54) SYSTEM AND METHOD FOR ADJUSTING IRRIGATION SYSTEM SCHEDULING

(71) Applicant: LINDSAY CORPORATION, Omaha, NE (US)

(72) Inventor: Kurtis Arlan Charling, Elkhorn, NE (US)

(73) Assignee: LINDSAY CORPORATION, Omaha, NE (US)

( * ) Notice: Subject to any disclaimer, the term of this patent is extended or adjusted under 35 U.S.C. 154(b) by 736 days.

(21) Appl. No.: 17/082,171

(22) Filed: Oct. 28, 2020

(65) Prior Publication Data
US 2022/0124992 A1  Apr. 28, 2022

(51) Int. Cl.
*A01G 25/16*  (2006.01)
*A01G 25/09*  (2006.01)

(52) U.S. Cl.
CPC ........... *A01G 25/16* (2013.01); *A01G 25/092* (2013.01)

(58) Field of Classification Search
CPC .......... A01G 25/092; A01G 25/16–167; A01G 25/09; A01G 25/165; A01G 25/162; A01C 21/005; A01C 21/007; A01C 23/007; A01C 23/00; A01C 23/027
USPC ....................................................... 239/728
See application file for complete search history.

(56) References Cited

U.S. PATENT DOCUMENTS

| | | | |
|---|---|---|---|
| 2018/0192599 A1* | 7/2018 | Bermudez Rodriguez | A01G 25/092 |
| 2019/0281776 A1* | 9/2019 | Magnusson | G06V 20/17 |
| 2020/0236836 A1* | 7/2020 | Barrick | A01B 79/005 |
| 2022/0100996 A1* | 3/2022 | Fu | A01M 21/046 |

FOREIGN PATENT DOCUMENTS

| | | |
|---|---|---|
| AU | 2016324138 | 1/2009 |
| CN | 109166049 | 1/2019 |
| EP | 3167698 | 4/2020 |
| WO | 2019224817 | 11/2019 |
| WO | 2020205177 | 10/2020 |

* cited by examiner

OTHER PUBLICATIONS

Intl. Search Report and Written Opinion for PCT Appln. No. PCT/US2021/055511; filed Oct. 19, 2021.

*Primary Examiner* — Joseph A Greenlund
*Assistant Examiner* — Juan C Barrera
(74) *Attorney, Agent, or Firm* — HOVEY WILLIAMS LLP

(57) ABSTRACT

An irrigation system and method of controlling operations of the irrigation system are provided. The irrigation system comprises a plurality of mobile support towers, a plurality of structural supports, a fluid-carrying conduit, water emitters, a sensor, and a control system. The plurality of mobile support towers are configured to move across a field. The plurality of structural supports extend between the mobile support towers, and the fluid-carrying conduit is supported above the field by the plurality of structural supports. The water emitters are coupled with the fluid-carrying conduit and emit water from the conduit onto the field. The sensor is supported on one of the structural supports or mobile support towers and is configured to capture data associated with a residue cover of a portion of the field. The control system is in communication with the sensor and is configured to receive the data associated with the residue cover of the portion of the field and determine a residue cover percentage for the portion of the field based on the data.

10 Claims, 4 Drawing Sheets

SYSTEM AND METHOD FOR ADJUSTING IRRIGATION SYSTEM SCHEDULING

BACKGROUND

Residue cover and/or tillage practice can impact crop water usage and available water, especially early in the growing season. If a field is covered with crop residue from a previous growing season, or as a result of a tillage practice, then crop evapotranspiration (ET) will be impacted, especially early in the growing season, depending on the amount of residue. Residue cover is typically expressed as a percentage of leftover residue covering the ground after seeding of the current crop has occurred. This value is typically estimated by laying out a certain length of tape measure and counting pieces of residue lying at certain intervals along the tape measure. This method is burdensome because it requires travel to and from a field and time spent taking the measurements in each field. This is especially burdensome when an operation includes multiple fields, some of which have different crops or employ different tillage practices.

The background discussion is intended to provide information related to the present invention which is not necessarily prior art.

SUMMARY

The present invention solves the above-described problems and other problems by providing an irrigation system and methods of controlling operations thereof that account for the residue cover and/or tillage practice of a field.

An irrigation system constructed according to an embodiment of the present invention may be a center pivot system of a lateral move system and comprises a plurality of mobile support towers, a plurality of structural supports, a fluid-carrying conduit, water emitters, a sensor, and a control system. The mobile towers are configured to move across a field. The structural supports extend between the mobile support towers, and the fluid-carrying conduit is supported above the field by the plurality of structural supports. The water emitters are coupled with the fluid-carrying conduit.

The sensor is supported on one of the structural supports or mobile support towers and is configured to capture data associated with a residue cover of a portion of the field. The control system is in communication with the sensor and is configured to receive the data associated with the residue cover of the field and determine a residue cover percentage for the portion of the field based on the data. By detecting a residue cover percentage using the sensor in real-time, a user can make adjustments to irrigation schedules, application depths and variable rate irrigation plans as a result of the reduced water usage at the beginning of the season. Additionally, such a system enables predicting residue cover without user input or the need for the user to visibly examine and determine residue cover, resulting in automatic irrigation schedule and irrigation plan adjustments.

A computer-implemented method of controlling operations of an irrigation system according to an embodiment of the present invention broadly comprises receiving in a control system data associated with residue cover of a portion of a field; determining, via the control system, a residue cover percentage for the portion of the field based on the data; and adjusting, via the control system, an application rate of the irrigation system based on the residue cover percentage.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
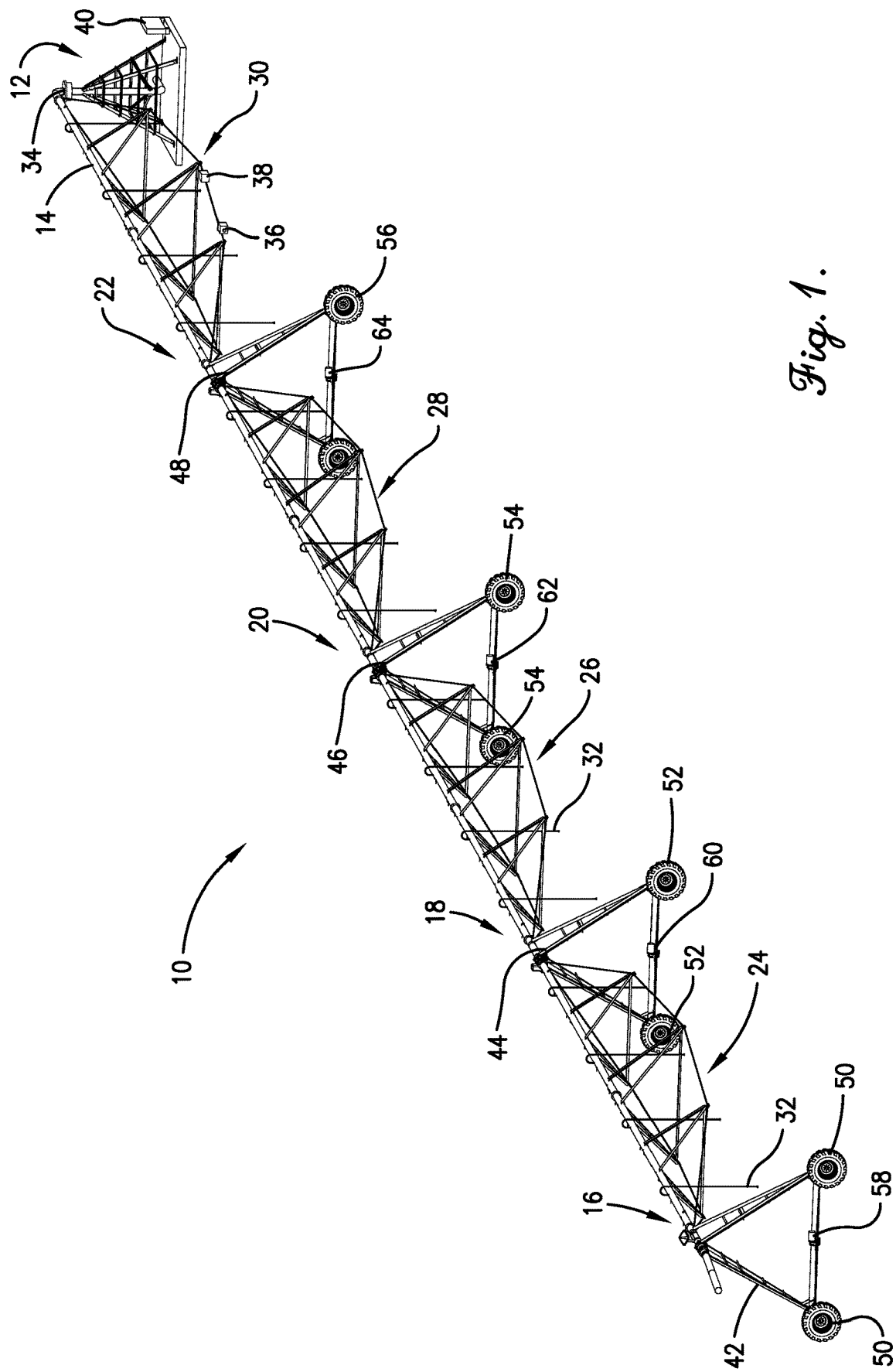
FIG. 1 is a perspective view of an exemplary irrigation system with which principles of the present invention may be implemented.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to FIG. 1, an irrigation system 10 constructed in accordance with an embodiment of the invention is illustrated. The illustrated irrigation system 10 is a pivot irrigation system, but can be any other irrigation system, such as a lateral irrigation system. The irrigation system 10 may have access to a hydrant, well, water tank, or other source 12 of water and may also be in fluid communication with a tank or other source of agricultural products to inject fertilizers, pesticides and/or other chemicals into the water for application during irrigation.

The irrigation system 10 may be a center pivot system of a lateral move system and may comprise a number of spaced-apart mobile towers 16, 18, 20, 22, a fluid-distribution conduit 14 in fluid communication with the water source 12 and supported by the towers 16, 18, 20, 22 above a field, a plurality of truss sections 24, 26, 28, 30 or other supports to form a number of interconnected spans that help support the conduit 14, a plurality of fluid emitters 32 that are in fluid communication with the conduit 14, one or more valves 34 for controlling flow of fluids to the emitters 32, one or more sensors 36 for capturing data about the field, a distance-measuring device 38, and a control system 40 for controlling operation of the irrigation system 10.

The mobile towers 16, 18, 20, 22 support the conduit 14 and carry the conduit 14 and emitters 32 across the field. Each mobile tower 16, 18, 20, 22, includes a frame 42, 44, 46, 48 for supporting a portion of the conduit 14 and wheels 50, 52, 54, 56 rotatably attached to the frame 42, 44, 46, 48. One or more of the towers 16, 18, 20, 22 may include a motor 58, 60, 62, 64 for driving the wheels 50, 52, 54, 56 of its respective tower 16, 18, 20, 22.

The conduit 14 spans across the irrigation system 10 and carries water and/or other fluids to the emitters 32. The conduit 14 may comprise piping, one or more hoses, or the like. Water and/or other fluids may travel from the water source 12 to the conduit 14, which directs them to the emitters 32.

The fluid emitters 32 apply the water and/or other fluids transported by the conduit 14 to the crops and/or soil beneath the conduit 14. The fluid emitters 32 are spaced along the truss sections 24, 26, 28, 30 and may include a plurality of sprayer heads, sprinkler drops, spray guns, drop nozzles, valves, and/or other devices.

The valves 34 control flow of water and/or other fluids through the emitters 32. The valves 34 may be controllable via one or more actuators, such as pneumatic actuator, hydraulic actuators, mechanical actuators, solenoid-type actuators, or the like. The valves 34 may be binary, in that they only shut on or off, and/or the valves 34 may adjust a flow rate of the water and/or other fluids flowing through the conduit 14 and/or the emitters 32. The irrigation system 10 may comprise only one valve 34 that controls the flow of water and/or other fluids to/through the conduit 14. The irrigation system 10 may alternatively or additionally comprise a plurality of valves 34 for such control. For example, a valve 34 may be in fluid communication with each emitter 32 so that the valve 34 controls the flow of water and/or other fluids through its corresponding emitter 32.

Figure 2:
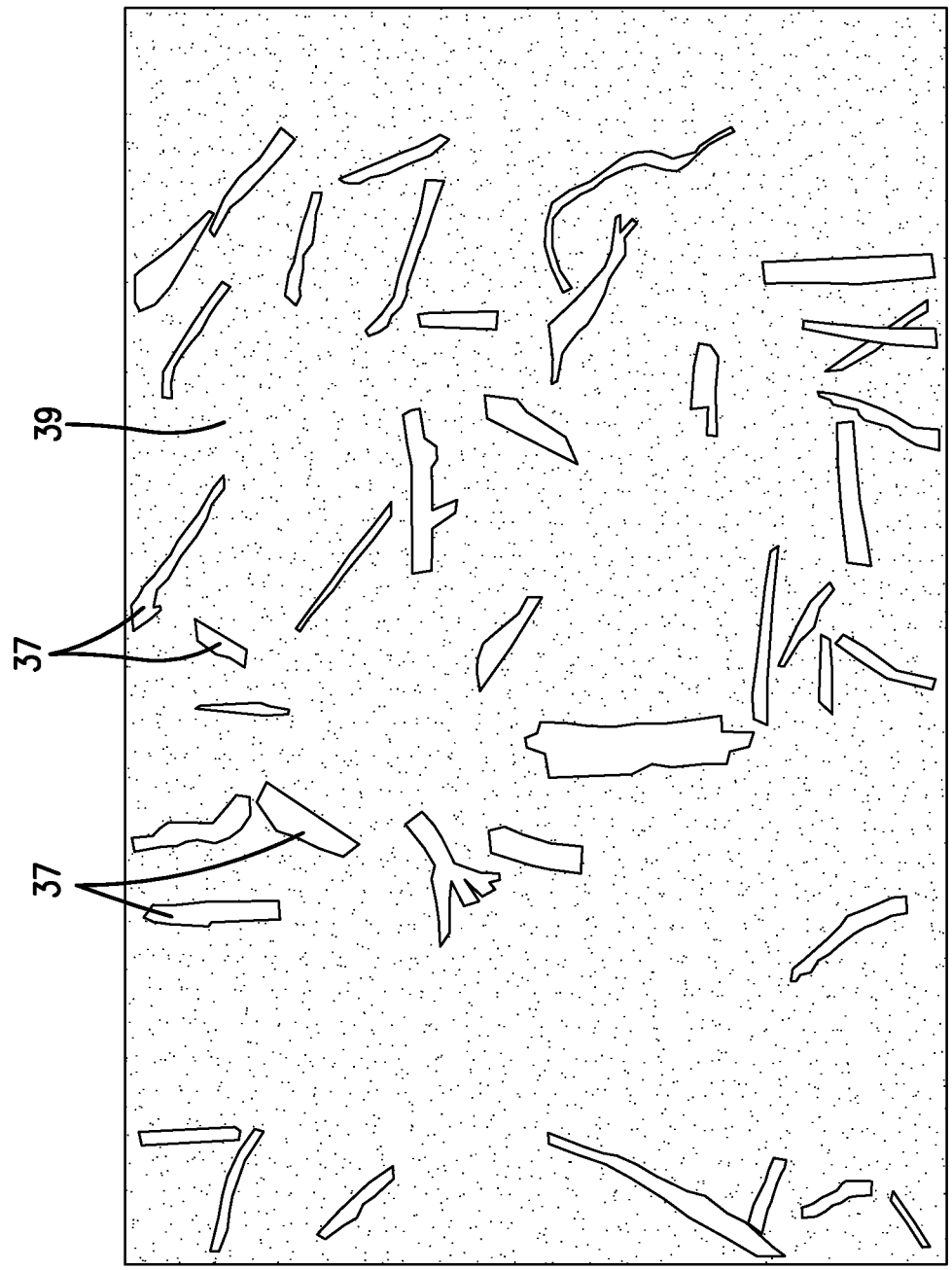
FIG. 2 is an example view of a portion of a field having residue cover.

The sensors 36 are configured to capture data about the field, climate, weather, soil, crops, or the like. In preferred embodiments, the sensors 36 are configured to capture data for determining a residue cover percentage for at least a portion of the field. The sensors 36 may comprise an image-capturing device, such as a camera, an infrared sensor, such as a thermal camera or other multi spectral image-capturing devices, or the like. The sensors 36 may be attached to, for example, one of the truss sections 24, 26, 28, 30. In some embodiments, the sensors 36 are configured to capture an image of a portion of the field below their respective truss sections 24, 26, 28, 30. An example image is depicted in FIG. 2 showing portions representing residue 37 disposed on the soil 39. In some embodiments, the sensors 36 may comprise moisture sensors, sensors for detecting water application rates, rain sensors, temperature sensors, RADAR devices, LIDAR devices, SONAR devices, or the like, or any sensor configured to capture data about the field, climate, weather, soil, crops, etc.

Turning back to FIG. 1, the distance-measuring device 38 is configured to measure a distance between a portion of the irrigation system 10 and a portion of the field. For example, the distance-measuring device 38 may be attached to one of the truss sections 24, 26, 28, 30 and configured to measure the distance to the ground in a portion of the field. The distance-measuring device 38 may include a LIDAR system configured to measure the distance via a laser, a RADAR system configured to measure the distance via radio waves, and/or a SONAR system configured to measure the distance via sound waves.

Figure 3:
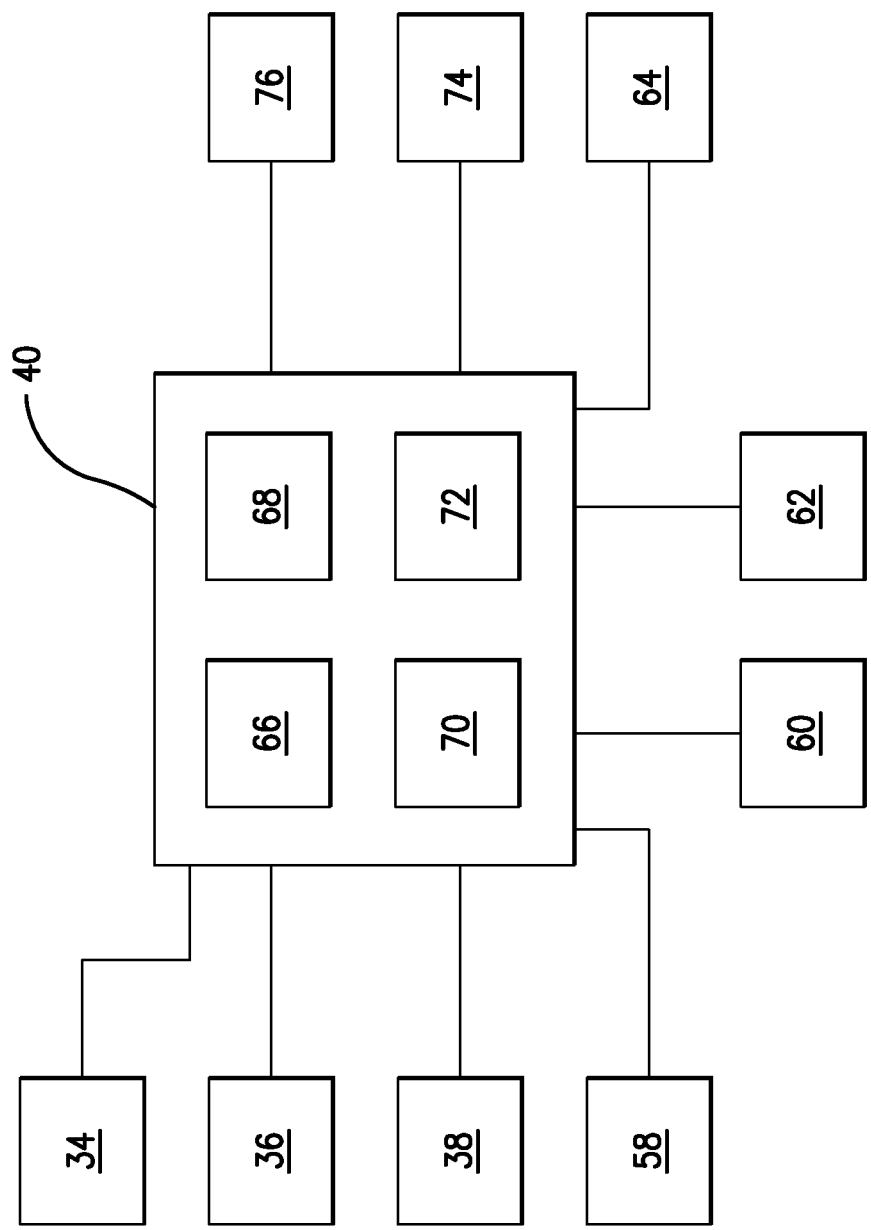
FIG. 3 is a block diagram depicting selected components of the irrigation system of FIG. 1.

The control system 40 is configured to control operations of the irrigation system 10. Turning to FIG. 3, the control system 40 may comprise a communication element 66, a memory element 68, a position-detection device 70, and a processing element 72. The communication element 66 may generally allow communication with systems or devices external to the control system 40. The communication element 66 may include signal or data transmitting and receiving circuits, such as antennas, amplifiers, filters, mixers, oscillators, digital signal processors (DSPs), and the like. The communication element 66 may establish communication wirelessly by utilizing RF signals and/or data that comply with communication standards such as cellular 2G, 3G, 4G, 5G, or LTE, WiFi, WiMAX, Bluetooth®, BLE, or combinations thereof. The communication element 66 may be in communication with the processing element 72 and the memory element 68.

The memory element 68 may include data storage components, such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 68 may be embedded in, or packaged in the same package as, the processing element 72. The memory element 68 may include, or may constitute, a "computer-readable medium". The memory element 68 may store the instructions, code, code segments, software, firmware, programs, applications, apps, services, daemons, or the like that are executed by the processing element 72.

The position-detection device 70 is configured to collect data for determining a position of a portion of the irrigation system 10. The position-detection device 70 may comprise a global positioning system (GPS) device and/or real-time kinematic (RTK) technology for determining a position of the portion of the irrigation system 10. For example, the position-detection device 70 may be positioned with the rest of the components of the control system 40 or positioned on, for example, one of the truss sections 24, 26, 28, 30.

The processing element 72 may include processors, microprocessors (single-core and multi-core), microcontrollers, DSPs, field-programmable gate arrays (FPGAs), analog and/or digital application-specific integrated circuits (ASICs), or the like, or combinations thereof. The processing element 72 may generally execute, process, or run instructions, code, code segments, software, firmware, programs, applications, apps, processes, services, daemons, or the like. The processing element 72 may also include hardware components such as finite-state machines, sequential and combinational logic, and other electronic circuits that can perform the functions necessary for the operation of the current invention. The processing element 72 may be in communication with the other electronic components through serial or parallel links that include address busses, data busses, control lines, and the like.

For example, the processing element 72 of the control system 40 may be in communication with one or more of the valves 34, one or more of the sensors 36, one or more of the distance-measuring devices 38, and/or one or more of the motors 58, 60, 62, 64 as depicted in FIG. 3. The processing element 72 may be in communication with the above components via the communication element 66 and/or direct wiring. The processing element 72 of the control system 40 may be configured to send and/or receive information to and/or from the above components. The processing element 72 of the control system 40 may also be configured to send and/or receive commands to and/or from the above components.

The processing element 72 of the control system 40 may be configured to determine a residue cover percentage based on the data collected from one or more of the following components: the sensor 36, the distance-measuring device 38, and/or position-detection device 70. The processing element 72 may also be configured to determine the residue cover percentage based on data received via wired or wireless communication, such as through the communication element 66 of the control system 40, with a remote device 74, such as a smart phone, remote server, laptop, or the like. The remote device 74 may provide data about the field, climate, weather, soil, crops, or the like to the processing element 72. For example, the remote device 74 may be a weather-data service or a database storing data about operations on the field. The processing element 72 may also be configured to determine the residue cover percentage based on data received through a user interface 76 on the irrigation system 10. The processing element 72 may also be configured to direct the communication element 66 to transmit collected data to the remote device 74 for determining the residue cover percentage.

For example, the processing element 72 may receive a crop type (including phenotype) previously harvested and/or a tillage method previously employed on the portion of the field from the user interface 76, the memory element 68, and/or the remote device 74. The processing element 72 may then use a look-up table stored on, for example, the memory element 68 to determine a residue cover percentage based on the crop type previously harvested and/or the tillage method. The processing element 72 may alternatively be configured to determine the crop type (including phenotype) previously planted based on data received from the sensor 36, the distance-measuring device 38, and/or position-detection device 70. The processing element 72 may alternatively be configured to transmit the crop type previously harvested and/or the tillage method previously employed on the portion of the field to the remote device 74, via the communication element 66, and receive the corresponding residue cover percentage from the remote device 74, via the communication element 66.

Additionally or alternatively, the processing element 72 may be configured to direct the sensor 36 to capture one or more image of the portion of the field. The image may include a red-green-blue (RGB) image, an infrared image, and/or a multispectral image, or the like, depending on the sensor 36. The processing element 72 may be configured to distinguish the pixels in the image indicative of soil versus residue cover. For example, the processing element 72 may be configured to determine that pixels from a color image having one or more particular RGB color model combinations are considered residue. The processing element 72 may count the total number of pixels indicative of residue cover and divide that by the total number of pixels in the image to determine the residue cover percentage. Additionally or alternatively, the processing element 72 may capture an image of the portion of the field with one or more sensors 36 comprising an infrared camera and/or multispectral camera and compare the pixels therein with a pixel profile indicative of residue cover to determine a residue cover percentage based on said images. The processing element 72 may be configured to compare residue cover percentages calculated from the different types of images in order to improve accuracy. The processing element 72 may be configured to determine the residue cover percentage based on the captured data through other methods without departing from the scope of the present invention.

The processing element 72 may also be configured to direct the distance-measuring device 38 to measure the distance between a portion of the irrigation system 10 and the ground. The processing element 72 may be configured to use the distance measured by the distance-measuring device 38 as a reference for determining a total area of the portion of the field captured in one or more of the images. The processing element 72 may also be configured to use the position data from the position-detecting system 70 to determine the area covered by one or more of the images. Further, the processing element 72 may be configured to use the position data to georeference one or more of the images captured by the sensor 36.

In some embodiments, the processing element 72 may be configured to transmit the data captured about the portion of the field to the remote device 74, via the communication element 66. The remote device 74 may be configured to calculate the residue cover percentage and transmit it back to the control system 40. The processing element 72 may be configured to receive the residue cover percentage from the remote device 74, via the communication element 66. In some embodiments, the processing element 72 may be configured to transmit one or more images and/or the residue cover percentage to the user interface 76 and/or the remote device 74 to provide a user with the information, such as an image, regarding residue cover.

The processing element 72 may be configured to adjust the irrigation of the field based on the residue cover percentage. For example, the processing element 72 may be configured to calculate a soil water depletion accounting for the residue cover percentage, and use the soil water depletion to determine when the irrigation system 10 should irrigate the field, an application rate, and/or how much water should be applied. The processing element 72 may be configured to calculate the soil water depletion by calculating a crop coefficient of the crop grown in the field. The processing element 72 may be configured to receive a crop type planted in the portion of the field from the user interface 76, the memory element 68, and/or the remote device 74. The processing element 72 may also be configured to receive from the user interface 76, the memory element 68, and/or the remote device 74 a growth stage of the crop in the portion of field in accordance with the Food and Agriculture Organization (FAO) standards.

The processing element 72 may be configured to calculate the crop coefficient based on the FAO growth stage according to one of the equations below with $K_{c,adj,i}$ representing the crop coefficient adjusted for residue cover percentage on day i, $K_{c,i}$ representing the original crop coefficient associated with the crop type on day i, $F_{mid}$ representing the midseason factor associated with the crop type, $F_{late}$ representing the late-season factor associated with the crop type, and $R_c$ represent the residue cover percentage. The processing element 72 may be configured to receive the values of the variables associated with the crop type from the user interface 76, the memory element 68, and/or the remote device 74. If the FAO growth stage is less than or equal to 2, then the processing element 72 may be configured to calculate the crop coefficient using Equation 1 below. If the FAO growth stage is 3, then the processing element 72 may be configured to calculate the crop coefficient using Equation 2 below. If the FAO growth stage is 4, then the processing element 72 may be configured to calculate the crop coefficient using Equation 3 below.

$$K_{c,ajd,i} = K_{c,i} \times (1 - 0.5 \times R_c) \qquad (1)$$

$$K_{c,ajd,i} = K_{c,i} \times (1 - F_{mid} \times R_c) \qquad (2)$$

$$K_{c,ajd,i} = K_{c,i} \times (1 - F_{late} \times R_c) \qquad (3)$$

The processing element 72 may be configured to adjust a crop evapotranspiration (on day i, $ET_{c,i}$) associated with the crop type by multiplying said crop evapotranspiration by the crop coefficient adjusted for residue cover percentage to produce the adjusted crop evapotranspiration ($ET_{c,adj,i}$), as shown in Equation 4 below. The processing element 72 may also be configured to adjust for any stress ($K_{s,i}$) on day i, as shown in Equation 5 below.

$$ET_{c,ajd,i} = K_{c,ajd,i} \times ET_{c,i} \qquad (4)$$

$$ET_{c,s,ajd,i} = K_{c,ajd,i} \times ET_{c,i} \times K_{s,i} \qquad (5)$$

The processing element 72 may be configured to calculate the soil water depletion ($D_i$) on a given day, i, using Equation 6 below, wherein $D_{i-1}$ represents soil water depletion from a previous day, $EP_i$ represents effective precipitation on day i, $I_i$ represents net irrigation depth applied on day i, and $CR_i$ represents capillary rise from groundwater table on day i. The processing element 72 may be configured to receive the previous day of soil water depletion, the effective precipitation, the irrigation depth, and the capillary rise from one or more of the sensors 36, the user interface 76, the memory element 68, and/or the remote device 74. The processing element 72 may be configured to determine whether stress on the crop should be factored and if so, use the stress-adjusted crop evapotranspiration calculated with Equation 5 above.

$$D_i = D_{i-1} + ET_{c,ajd,i} - EP_i - I_i - CR_i \qquad (6)$$

The processing element 72 may be configured to adjust an irrigation plan, an irrigation schedule, one or more valves 34, and/or one or more of the motors 56, 58, 60, 62 based on the soil water depletion adjusted for residue cover percentage. The processing element 72 may be configured to adjust the irrigation of the field accounting for the residue cover percentage through other methods and techniques without departing from the scope of the present invention.

In some embodiments, the processing element 72 is configured to transmit the image captured by one or more of the sensors 36 and/or a distance measured by the distance-measuring device 38 to the user interface 76 and/or the remote device 74 for enabling a user to assess and/or estimate residue cover percentage. If the user provides an estimation for residue cover percentage, the processing element 72 may be configured to use the estimation for adjusting, for example, the irrigation schedule and/or calculating the soil water depletion.

Figure 4:
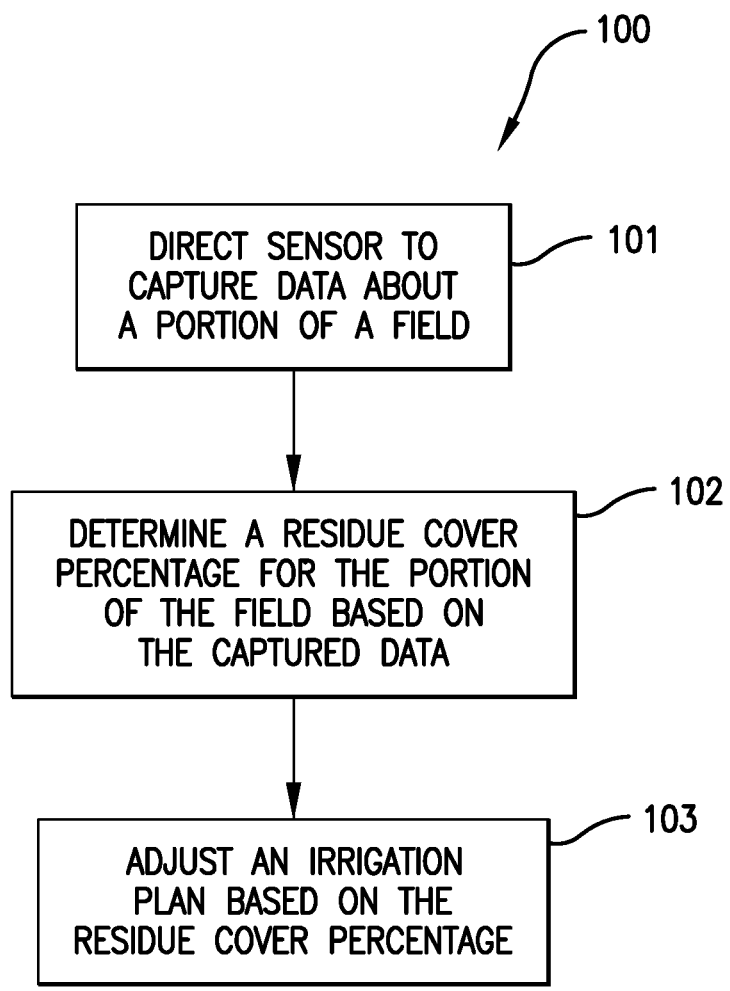
FIG. 4 is a flowchart depicting exemplary steps of a method according to an embodiment of the present invention.

The flow chart of FIG. 4 depicts the steps of an exemplary method 100 of controlling operations of an irrigation system. In some alternative implementations, the functions noted in the various blocks may occur out of the order depicted in FIG. 4. For example, two blocks shown in succession in FIG. 4 may in fact be executed substantially concurrently, or the blocks may sometimes be executed in the reverse order depending upon the functionality involved. In addition, some steps may be optional.

The method 100 is described below, for ease of reference, as being executed by exemplary devices and components introduced with the embodiments illustrated in FIGS. 1-3. The steps of the method 100 may be performed by the control system 40 through the utilization of processors, transceivers, hardware, software, firmware, or combinations thereof. However, some of such actions may be distributed differently among such devices or other devices without departing from the spirit of the present invention. Control of the system may also be partially implemented with computer programs stored on one or more computer-readable medium (s). The computer-readable medium(s) may include one or more executable programs stored thereon, wherein the program(s) instruct one or more processing elements to perform all or certain of the steps outlined herein. The program(s) stored on the computer-readable medium(s) may instruct processing element(s) to perform additional, fewer, or alternative actions, including those discussed elsewhere herein.

Referring to step 101, a sensor positioned on an irrigation system is directed, via a control system, to capture data about a portion of a field. The sensor may comprise an image-capturing device, such as a camera, an infrared sensor, such as a thermal camera or other multispectral image-capturing devices, or the like. The sensor may be attached to, for example, a truss section of the irrigation system. The captured data may comprise an RGB image, a multispectral image, an infrared/thermal image, or the like.

Referring to step 102, a residue cover percentage for the portion of the field is determined, via the control system, based on the data captured about the portion of the field. For example, a processing element of the control system may receive a crop type (including phenotype) previously harvested and/or a tillage method previously employed on the portion of the field from a user interface of the control system, a memory element and/or database, and/or a remote device. The processing element may then use a look-up table stored on, for example, the memory element to determine a residue cover percentage based on the crop type previously harvested and/or the tillage method. The processing element may alternatively be configured to transmit the crop type previously harvested and/or the tillage method previously employed on the portion of the field to the remote device, via a communication element of the control system, and receive the corresponding residue cover percentage from the remote device, via the communication element.

Additionally or alternatively, the processing element may be configured to distinguish the pixels in the image indicative of soil versus residue cover. For example, the processing element may be configured to determine that pixels from a color image having one or more particular red-green-blue (RGB) color model combinations are considered residue. The processing element may count the total number of pixels indicative of residue cover and divide that by the total number of pixels in the image to determine the residue cover percentage. Additionally or alternatively, the processing element may capture an image of the portion of the field with one or more sensors comprising an infrared camera and/or multispectral camera and compare the pixels therein with a pixel profile indicative of residue cover to determine a residue cover percentage based on said images. This step may include comparing, via the processing element, residue cover percentages calculated from the different types of images in order to improve accuracy. The processing element may be configured to determine the residue cover percentage based on the captured data through other methods without departing from the scope of the present invention.

In some embodiments, this step may include transmitting the data captured about the portion of the field to a remote device, via the communication element. The remote device may be configured to calculate the residue cover percentage and transmit it back to the control system. The processing element may be configured to receive the residue cover percentage from the remote device, via the communication element.

Referring to step 103, an irrigation plan may be adjusted, via the control system, based on the residue cover percentage. For example, the processing element of the control system may be configured to calculate a soil water depletion accounting for the residue cover percentage, and use the soil water depletion to determine when the irrigation system should irrigate the field and how much. The processing element may be configured to calculate the soil water depletion by calculating a crop coefficient of the crop grown in the field. The processing element 72 may be configured to receive a crop type planted in the portion of the field from the user interface, the memory element, and/or the remote device. The processing element may also be configured to receive from the user interface, the memory element, and/or the remote device a FAO growth stage of the crop in the portion of field.

This step may include calculating, via the processing element, the crop coefficient based on the FAO growth stage according to one of the equations above. The processing element may be configured to receive the values of the variables associated with the crop type from the user interface, the memory element, and/or the remote device. The processing element may be configured to determine which Equation (1-3) to use based on the FAO growth stage.

The processing element may be configured to adjust a crop evapotranspiration associated with the crop type, as shown in Equation 4 above. The processing element 72 may also be configured to adjust for any stress, as shown in Equation 5 above.

The processing element may be configured to calculate the soil water depletion using Equation 6 above. This step may include receiving, via one or more of the sensors, the user interface, the memory element, and/or the remote device, the previous day of soil water depletion, the effective precipitation, the irrigation depth, and the capillary rise. The processing element may be configured to determine whether stress on the crop should be factored and if so, use the stress-adjusted crop evapotranspiration calculated with Equation 5 above.

The method 100 may include additional, less, or alternate steps and/or device(s), including those discussed elsewhere herein. Further, the steps discussed herein may be performed automatically without any involvement from a user. In some embodiments, the steps may be performed after prompting and approval by a user.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim (s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An irrigation system comprising:
   a plurality of mobile support towers configured to move across a field;
   a plurality of structural supports extending between the mobile support towers;
   a fluid-carrying conduit supported above the field by the plurality of structural supports;
   water emitters coupled with the fluid-carrying conduit;
   a sensor supported on one of the plurality of structural supports or on one of the plurality of mobile support towers and configured to capture data associated with a residue cover of a portion of the field;
   a distance measuring device supported on one of the plurality of structural supports or on one of the plurality of mobile support towers and configured to capture data associated with a distance between the distance measuring device and the ground;
   a position-detection device supported on one of the plurality of structural supports or on one of the plurality of mobile support towers and configured to capture position data associated with the portion of the field; and
   one or more processor in communication with the sensor, the position-detection device, and the distance measuring device, the one or more processor being configured to—
      receive the data associated with the residue cover of the portion of the field;
      receive the data associated with the distance between the distance measuring device and the ground;
      geo-reference the data associated with the residue cover of the portion of the field using the position data;
      determine a size of a total area of ground of the portion of the field represented by the data associated with the residue cover based at least in part on the data associated with the distance between the distance measuring device and the ground;
      determine a residue cover percentage for the portion of the field based on the data associated with the residue cover, the size of the total area of ground, and the position data; and adjust an amount of water applied to the portion of the field based on the residue cover percentage.

2. The irrigation system of claim 1, wherein the one or more processor is configured to calculate a soil water depletion value based on the residue cover percentage.

3. The irrigation system of claim 1, wherein the sensor comprises a camera configured to capture an image of the field.

4. The irrigation system of claim 3, wherein the one or more processor is configured to analyze the image of the field to determine a percentage of the image that depicts residue cover in order to determine the residue cover percentage for the portion of the field.

5. The irrigation system of claim 3, further comprising a multispectral camera configured to capture a multispectral image of the field, wherein the one or more processor is configured to determine a second estimated residue cover percentage based on the multispectral image and compare the residue cover percentage determined using the sensor with the second estimated residue cover percentage.

6. The irrigation system of claim 1, wherein the distance measuring device comprises at least one of a LIDAR system, a RADAR system, or an ultrasonic distance measuring system.

7. The irrigation system of claim 1, wherein the sensor comprises an infrared sensor.

8. The irrigation system of claim 1, further comprising a transceiver in communication with the sensor and the one or more processor and configured to receive signals representative of the data associated with the residue cover of the field from the sensor and transmit signals representative of the data associated with the residue cover of the field to the one or more processor, wherein the processor is part of a remote server.

9. The irrigation system of claim 1, wherein the one or more processor is configured to receive a phenotype of a crop previously planted in the portion of the field, and determine the residue cover percentage based at least in part on the phenotype of the crop previously planted in the portion of the field.

10. The irrigation system of claim 1, wherein the wherein the one or more processor is configured to determine a predicted phenotype of a crop previously planted in the portion of the field based at least in part on the data associated with the residue cover of a portion of the field, and determine the residue cover percentage based at least in part on the predicted phenotype of the crop previously planted in the portion of the field.

* * * * *